United States Patent [19]
Laskaris

[11] 4,082,967
[45] Apr. 4, 1978

[54] UNIFORMLY-COOLED SUPERCONDUCTING ROTOR

[75] Inventor: Evangelos T. Laskaris, Schenectady, N.Y.

[73] Assignee: General Electric Company, Schenectady, N.Y.

[21] Appl. No.: 672,272

[22] Filed: Mar. 31, 1976

[51] Int. Cl.$^2$ ............................................. H02K 1/32
[52] U.S. Cl. ...................................... 310/64; 310/10
[58] Field of Search ................. 310/64, 10, 40, 52, 310/61; 62/505

[56] References Cited

U.S. PATENT DOCUMENTS

| | | | |
|---|---|---|---|
| 3,626,717 | 12/1971 | Lorch | 310/61 |
| 3,665,229 | 5/1972 | Lorch | 310/52 |
| 3,745,389 | 7/1973 | Lorch | 310/52 |
| 3,809,933 | 5/1974 | Sugawara | 310/10 |
| 3,816,780 | 6/1974 | Smith | 310/52 |
| 3,942,053 | 3/1976 | Abolins | 310/10 |

OTHER PUBLICATIONS

A. Betan, M.I.T. PH.D Thesis, Improved Thermal Design of Cryogenic System for Superconducting Synchronous Generator, 12/20/74, pp. 148–155.

*Primary Examiner*—R. Skudy
*Attorney, Agent, or Firm*—Marvin Snyder; Joseph T. Cohen; Jerome C. Squillaro

[57] ABSTRACT

A superconducting rotor for an electrical machine is divided into three chambers, each of the two outer chambers being encircled by thermal distance extensions. Excess cryogenic coolant vapor due to coolant pool boiling in the center chamber of the rotor is released to a circumferential heat exchanger of larger diameter than the thermal distance extensions, warmed therein to ambient temperature, and returned to be reliquefied, thus avoiding thermal distance extension overcooling and attendant adverse mechanical consequences.

13 Claims, 2 Drawing Figures

UNIFORMLY-COOLED SUPERCONDUCTING ROTOR

INTRODUCTION

This invention relates to electrical machines employing superconducting rotors, and more particularly to a method and apparatus for preventing overcooling of superconducting rotor thermal distance extensions.

Successful development of large superconducting synchronous machines, such as generators, depends upon reliable operation of the superconducting field winding at high current densities consistent with the critical current density of the superconductor employed in the winding. High field winding current density can be achieved with a niobium-titanium superconductor and an epoxy-impregnated winding, provided that temperature of the winding can be accurately controlled at or below the boiling point of a cryogenic coolant, such as liquid helium, employed to cool the superconductor.

In typical filamentary niobium-titanium superconductor, at magnetic fields of 7.5 Tesla, each degree of temperature drop below 4.2° K increases the superconductor critical current density by about 50%. It is desirable, therefore, to employ a coolant circuit which can maintain the superconductor temperature below 4.2° K while saturated liquid coolant at 4.2° K or above is supplied to the rotor from a refrigerator or a liquefier.

A coolant flow circuit capable of operation in large diameter superconducting rotors is described and claimed in E. T. Laskaris et al. application Ser. No. 573,168, filed Apr. 30, 1975 and assigned to the instant assignee. The coolant flow circuit of the Laskaris et al. application, which operates with cryogenic coolant (e.g. helium) supply pressure slightly above atmospheric and maintains the liquefied coolant in the rotor at a temperature below 4.2° K, also provides external control of the liquefied coolant level in the rotor. During transient heating of the rotor winding due, for example, to changes in the field current or transition of the superconductor state from superconducting to normal, overcooling of the rotor thermal distance extensions can cause asymmetric temperature distribution which may result in rotor distortion, in the form of bowing, and consequential, severe dynamic unbalance. It therefore would be desirable to achieve further reduction of the superconductor operating temperature together with capability to exhaust transient flow of cold cryogenic vapor through a heat exchanger to prevent overcooling of the rotor structure.

Accordingly, one object of the invention is to provide a method and apparatus for maintaining a superconducting rotor undistorted and in dynamic balance by maintaining a symmetric temperature distribution along the rotor.

Another object is to provide a method and apparatus for maintaining cryogenic coolant vapor flow through thermal distance extensions of a superconducting rotor torque tube unaffected by transient heating of the rotor winding.

Another object is to provide a method and apparatus for increasing the critical current of the superconductor in a superconducting rotor winding by maintaining the cryogenic liquid coolant temperature around the winding below the normal boiling point of the coolant.

Briefly, in accordance with a preferred embodiment of the invention, a cryogenic coolant flow circuit for a rotor having three axially-adjacent chambers therein, with each chamber being open to its adjacent chamber through their common wall and with superconductive windings situated within the inner chamber, comprises means for delivering liquefied cryogenic coolant into a first outer one of the chambers. The liquefied coolant flows into the inner chamber and thence to the second outer one of the chambers through the openings in their common walls. First and second thermal distance extensions are situated within the rotor axially outward of the first and second outer chambers, respectively. Each of the thermal distance extensions is in gaseous communication with the first and second outer chamber, respectively, so as to receive vaporized coolant therefrom. Heat exchanger means are situated circumferentially about the rotor radially outward of the three chambers, the heat exchanger means being in gaseous communication with the radially-central region of the inner chamber so as to receive the vapor released by coolant boiling in the inner chamber.

In accordance with another preferred embodiment of the invention, a method of maintaining at uniform cryogenic temperature a rotor containing a superconductive winding in an inner one of three axially-adjacent chambers comprises delivering liquefied cryogenic coolant into a first outer one of the chambers, the liquefied coolant flowing into the inner chamber and thence to the second outer one of the chambers through mutual openings in each pair of axially-adjacent chambers. Vaporized coolant is conducted from each of the first and second outer chambers, respectively, to each respective one of a pair of thermal distance extensions situated within the rotor axially outward of each of the first and second outer chambers, respectively. The vapor released by coolant boiling in the inner chamber is vented to heat exchanger means radially outward of the three chambers, thereby reducing pressure and temperature at the coolant liquid-vapor interface in the inner chamber below the corresponding pressure and temperature in the first and second outer chambers.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
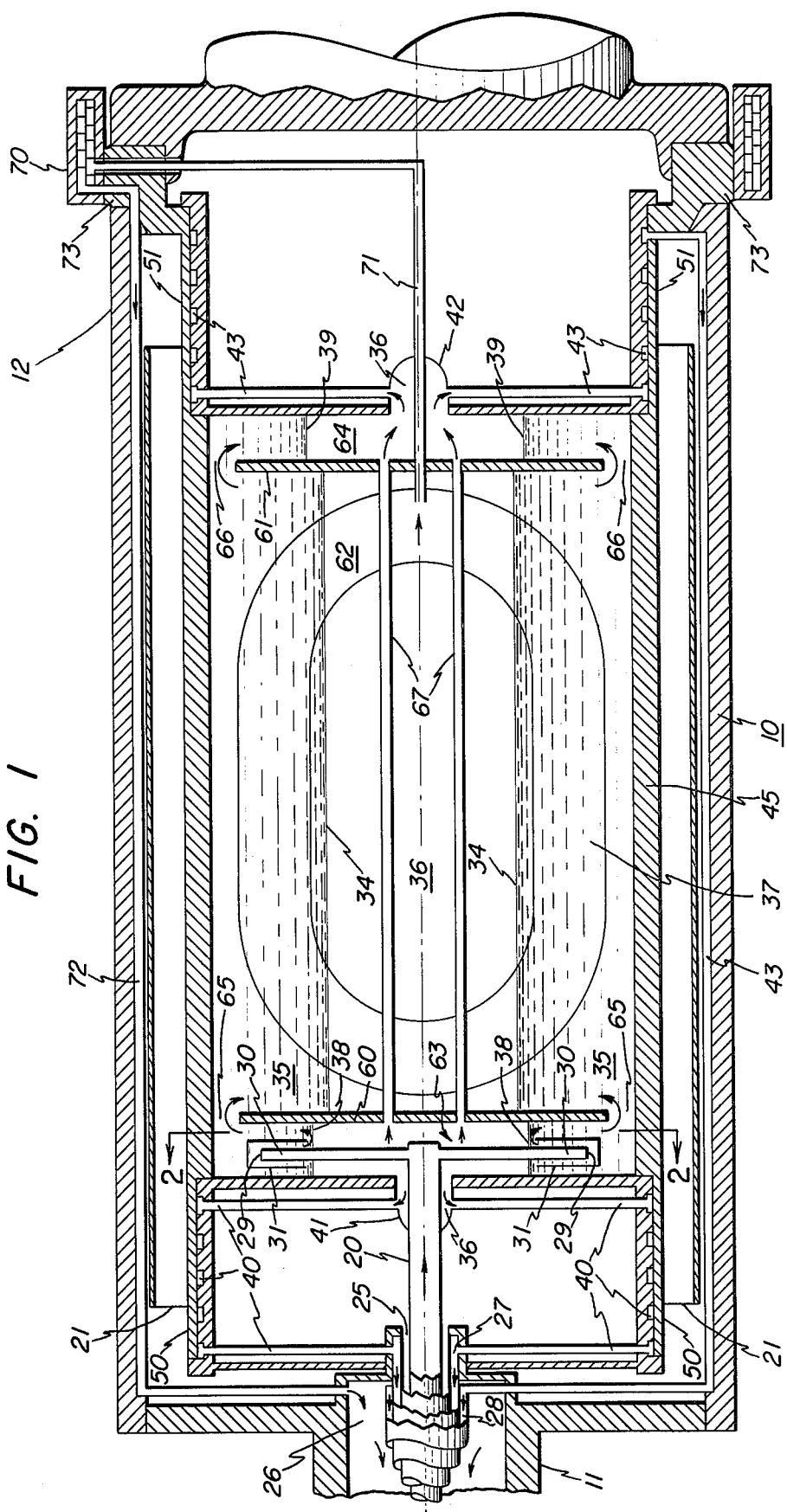
FIG. 1 is a schematic, partly sectional, longitudinal view of a superconductive AC generator rotor employing the instant invention.

In FIG. 1, a superconductive rotor 10 for an AC machine, such as a generator, includes a driven end 12 and a non-driven or collector end 11, and contains a rotor torque tube 45 therein. Cryogenic refrigerant in the form of liquefied coolant, typically helium at 4.2° K, is supplied to the collector end of the rotor through a conduit 20 from a transfer joint (not shown) in a manner such as described and claimed in B. D. Hatch application Ser. No. 573,170, filed Apr. 30, 1975 or E. T. Laskaris application Ser. No. 573,169, filed Apr. 30, 1975, now U.S. Pat. No. 3,991,588, issued Nov. 16, 1976, both of which are assigned to the instant assignee.

Conduit 20, which rotates axially about longitudinal axis 16 in unison with rotor 10, is terminated at refrigerant dispensing means comprising a pair of open-ended hollow radial tubes 30, each of which is surrounded by a cylindrical enclosure 31. The refrigerant dispensing means, shown schematically in FIG. 1, is described in greater detail in the aforementioned E. T. Laskaris et al. application Ser. No. 573,168, the disclosure of which is incorporated herein by reference. Coolant in the liquid phase emerging from the radial tubes splashes on a surface 29 of a pool 35 of coolant in the liquid phase contained in rotor 10. Pool 35 is separated centrifugally from a central core 36 of coolant in the vapor phase due to rotation of the rotor. That is, the greater density of the liquefied coolant in comparison to the gaseous coolant results in liquefied coolant of pool 35 being thrust outward from rotor axis of rotation 16 leaving a central core 36 of evaporated gas. Rotor windings 37 are immersed in pool 35.

Coolant in the vapor phase in rotor 10 is returned from collector end 11 through a hub 41 in gaseous communication with central core 36 of coolant in the vapor phase. The gaseous coolant flows from hub 41 through tubing 40 into a conduit 27 which conducts the coolant to the transfer joint (not shown) from whence it is discharged for reliquefication. Similarly, coolant in the vapor phase is returned from the driven end 12 of rotor 10 through a hub 42 in gaseous communication with central core 36 of coolant in the vapor phase, the gaseous coolant flowing from hub 42 through tubing 43 into a conduit 28 which furnishes the coolant to the transfer joing (not shown) from whence it is discharged for reliquefication.

Tubing 40 and 43 may be patterned through rotor torque wall 45 in an arrangement to provide high heat absorption capacity at either end of the rotor and thereby reduce the quantity of liquefied coolant necessary to be supplied to the rotor. For example, tubing 40 in region 50 and tubing 43 in region 51, which regions exist beyond the axial extent of liquefied coolant pool 35 and are denominated thermal distance extensions, are spiralled to provide coolant channels for counterflow cooling of the thermal distance extensions to isolate thermally the liquefied coolant pool from the ends of rotor torque tube 45. The arrows shown in the conduits of the rotor illustrate the conduit flow directions. No continuous flow occurs through annulus 25 between conduits 20 and 27 inasmuch as annulus 25 is a vacuum jacket terminated at a sealed end (not shown), such as a bellows, located in the transfer joint (not shown). A typical termination of this type is illustrated in the aforementioned E. T. Laskaris application Ser. No. 573,169.

A pair of walls 60 and 61 divide the interior of rotor torque tube 45 into an inner chamber 62 in which winding 37 and its support structure (not shown) are contained, and a pair of outer chambers 63 and 64 axially adjacent chamber 62. Outer chambers 63 and 64 are situated axially inward of torque tube thermal distance extensions 50 and 51, respectively. Walls 60 and 61, while providing thermal isolation between chambers 63 and 62, and chambers 62 and 64, respectively, contain peripheral openings such as slots 65 and 66, respectively, permitting flow of liquid coolant from chamber 63 to chamber 62, and from chamber 62 to chamber 64, as indicated by arrows in those regions. A plurality of axially-directed tubes 67 between walls 60 and 61, situated radially inward of slots 65 and 66 at a sufficient distance to be within the vaporized coolant core, permit direct gaseous communication between chambers 63 and 64, with gas flow as indicated by the associated arrows. The outermost shell 21 within rotor 10 comprises a thermal radiation shield.

A heat exchanger 70, typically comprised of stainless steel, is situated circumferentially about driven end 12 of rotor 10 so as to be located radially outward of the three axially-aligned chambers 62, 63 and 64 and axially outward of chamber 64. Heat exchanger 70, which is thermally isolated from rotor 10 by radial struts 73, receives coolant vapor from central core 36 of coolant in chamber 62 through wall 61 and hub 42 and then turns radially outward to the heat exchanger. Although tubing 71 is depicted as passing through the center of hub 42 and wall 61, those skilled in the art will recognize that tubing 71 may be at a predetermined location off center with respect to hub 42 and disk 61, as long as it enters into central core 36 of coolant vapor in chamber 62. Coolant vapor warmed close to ambient temperature in heat exchanger 70 is returned to the liquefier (not shown) for reliquefication.

Coolant discharged from radial tubes 30 expands radially to the surface 38 of coolant pool 35 in chamber 63 as it flows through the annulus between each of radial tubes 30 and the respective, surrounding, cylindrical, open-ended enclosure 31, as indicated by the associated arrows. As the coolant expands, its temperature is reduced to the saturation temperature of the portion of coolant pool 35 in chamber 62.

To control coolant mass flow rate through the rotor, the liquefied coolant is supplied through conduit 20 at constant pressure slightly above atmospheric. If the evaporation rate of coolant pool 35 exceeds the helium mass flow rate, the resulting reduction in coolant pool depth causes a corresponding reduction in coolant discharge pressure from radial tubes 30 and a simultaneous vapor pressure reduction in central conduit 20. by maintaining the liquid coolant supply pressure constant, any pressure reduction in the rotor increases the helium mass flow rate through conduit 20 to maintain substantially constant the depth of coolant pool 35. Conversely, if the coolant pool evaporation rate is exceeded by the helium mass flow rate, the resulting increase in winding pool depth increases the vapor pressure in axial supply tube 20, thereby reducing the coolant mass flow rate through the rotor until the depth of the coolant pool is restored. Thus the direct relationship between the position of coolant pool surface 34 in chamber 62 and pressure in axial supply tube 20 provides self-regulation of the coolant mass flow rate through the rotor, ensuring that rotor winding 37 is always immersed in liquid coolant.

Coolant vapor released in chamber 63 in part supplies thermal distance extension 50 through hub 41 and tubing 40, and in part flows through axial tubes 67 to chamber 64. The liquefied coolant delivered in chamber 63 is free to flow axially to chamber 62 through mutual openings 65 therebetween and from chamber 62 to chamber 64 through mutual openings 66 therebetween. Heat flow to chamber 63 (i.e., a "heat leak") is primarily due to conduction from torque tube thermal distance extension 50.

During normal operation of the rotor, heat entering chamber 62 generally comprises radiation heat losses and losses due to the higher enthalpy liquid coolant received from chamber 63, the relatively elevated enthalpy of the liquefied coolant in chamber 63 being due mainly to the relatively large radius of heat exchanger 70 as compared to the radius of tubing 40 in region 50. More specifically, saturation pressure and temperature of the liquefied coolant in chamber 62 depend exclusively on the compressing process through which cold vapor from chamber 62 is delivered radially through tubing 71 to heat exchanger 70. Similar vapor compression occurs when the vapor in chambers 63 and 64 is delivered radially to torque tube thermal distance extensions 50 and 51, respectively. Owing to the larger radius of heat exchanger 70 relative to the radius of torque tube thermal distance extensions 50 and 51, the saturation vapor pressure and temperature of the liquefied coolant pool in chamber 62 are lower than the corresponding saturation vapor pressure and pool temperature in each of chambers 63 and 64.

During transient heating of winding 37 or torque tube 45 (due, for example, to a rapid increase in winding current amplitude, superconductor transition to normal, residual flux penetration of the rotor caused by an electrical fault in the generator load circuit, an unbalanced electrical load, etc.) substantial heat build-up might occur in chamber 62. In such event, excess coolant vapor released from the transient heating of the winding may escape to heat exchanger 70 without significantly affecting coolant flow through thermal distance extensions 50 and 51. This avoids forcing the excess vapor through thermal distance extensions 50 and 51, thereby preventing overcooling of the thermal distance extensions and attendant transient asymmetric temperature distribution in the axial direction along the rotor. As a result, potential distortion and dynamic unbalance of the rotor due to these factors is avoided.

Chamber 64, while receiving liquid coolant directly from chamber 62, receives vaporized coolant from chamber 63 through axial tubing 67. Heat build-up in chamber 64 is primarily due to conduction from torque tube thermal distance extension 51. Coolant vapor from chamber 64 along with coolant vapor received through tubing 67 is delivered to thermal distance extension 51. In addition, tubing 67 maintains vapor pressures in chambers 63 and 64 equal.

Vaporized coolant from chamber 62 flows to heat exchanger 70 through an adiabatic compression process, and the warmed vapor from the heat exchanger is exhausted as a separate flow stream to the coolant liquefier (not shown). By virtue of this compression-heating-expansion process, subatmospheric pressure results at free surface 34 of liquid coolant 35 in chamber 62. Because the radius of heat exchanger 70 is larger than the radius of torque tube extensions 50 and 51, both the pressure and temperature at the coolant liquid-vapor interface 34 in chamber 62 are lower than the corresponding pressure and temperature at the coolant liquid-vapor interfaces 38 and 39 in chambers 63 and 64, respectively, as previously described. Consequently, critical current of the superconductor in rotor winding 37 is increased over what it would otherwise be in liquefied coolant at the temperature of the liquefied coolant in chamber 63 o4 64.

Th radius of surface 34 of coolant pool 35 in chamber 62 is smaller than the radii of coolant pool surfaces 38 and 39 in chambers 63 and 64, respectively. If chamber 62 were completely filled with liquid coolant, heat exchanger 70 would receive liquid droplets and the warmed coolant vapor flow through conduit 26 would abruptly be substantially increased. This abrupt increase in warmed coolant vapor flow through conduit 26 may be sensed by a flow meter (not shown) and thus serves as a parameter on which to base adjustment of pressure of the liquefied coolant supply, such that chamber 62 is maintained nearly filled with liquefied coolant; that is, the abrupt increase in warmed coolant vapor flow through conduit 26 signifies that the level of liquefied coolant in chamber 62 has reached tubing 71, which is at a predetermined location within a radially-central region in chamber 62 in which central core 36 of coolant vapor is contained. The coolant supply pressure to conduit 20 is then slightly reduced, ensuring that the level of liquefied coolant in chamber 62 remains just radially outward of the predetermined location (which may, if desired, be noncoaxial with respect to longitudinal axis 16 within central core 36).

Figure 2:
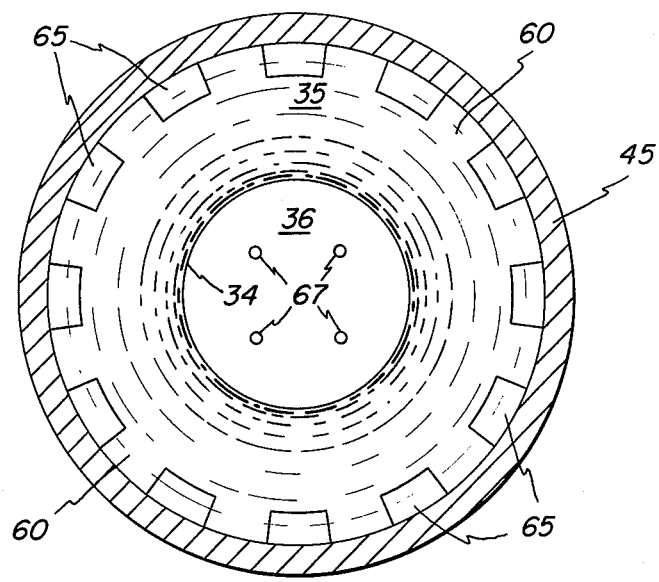
FIG. 2 is a view taken along line 2—2 of FIG. 1.

FIG. 2 is a sectional view taken along line 2—2 in FIG. 1, showing typical relative location of axial tubes 67 with respect to interface 34 of liquefied coolant 35 and vaporized coolant 36, as well as a typical arrangement of openings 65 about the periphery of disk 60 within torque tube 45 which permit flow of liquid coolant between adjacent chambers separated by wall 60.

The foregoing describes a method and apparatus for maintaining a superconducting rotor undistorted and in dynamic balance by sustaining a symmetric temperature distribution along the rotor. A method and apparatus are provided for maintaining cryogenic coolant vapor flow through the thermal distance extensions of a superconducting rotor torque tube unaffected by transient heating of the rotor winding. Critical current of the superconductor in the rotor winding is increased by keeping the cryogenic liquid coolant temperature around the winding below the normal boiling point of the coolant.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. A cryogenic coolant flow circuit for a rotor having three axially-adjacent chambers therein, each chamber being open to its adjacent chamber through openings in a common wall therebetween and with superconductive windings situated within the inner chamber, said flow circuit comprising:
    means for delivering liquefied cryogenic coolant into a first outer one of said chambers, said liquefied coolant flowing into said inner chamber and thence to the second outer one of said chambers through said openings;
    first and second thermal distance extensions situated within said rotor axially outward of said first and second outer chambers, respectively, each of said thermal distance extensions being in gaseous communication with said first and second outer chamber, respectively, so as to receive vaporized coolant therefrom; and
    heat exchanger means situated circumferentially about said rotor radially outward of said three chambers, said heat exchanger means being in gaseous communication with the radially-central region of said inner chamber so as to receive released by coolant boiling in said inner chamber.

2. The cryogenic coolant flow circuit of claim 1 including means located radially-inward of the openings in said common walls for providing direct gaseous communication between the radially-central regions of said first and second outer chambers.

3. The cryogenic coolant flow circuit of claim 1 wherein said heat exchanger means is situated axially outward of said second thermal distance extension.

4. The cryogenic coolant flow circuit of claim 2 wherein said heat exchanger means is situated axially outward of said second thermal distance extension.

5. The cryogenic coolant flow circuit of claim 2 wherein said means located radially-inward of the openings in said common walls for providing direct gaseous communication between the radially-central regions of said first and second outer chambers comprises at least one conduit passing axially through the radially-central region of said inner chamber.

6. The cryogenic coolant flow circuit of claim 5 wherein said heat exchanger means is situated axially outward of said second thermal distance extension.

7. A method of maintaining at uniform cryogenic temperature a rotor containing superconductive windings in an inner one of three axially-adjacent chambers, comprising the steps of:
   delivering liquefied cryogenic coolant into a first outer one of said chambers, said liquefied coolant flowing into said inner chamber and thence to the second outer one of said chambers through mutual openings in each pair of axially-adjacent chambers;
   conducting vaporized coolant from each of said first and second outer chambers, respectively, to each respective one of a pair of thermal distance extensions situated within said rotor axially-outward of each of said first and second outer chambers, respectively; and
   venting vapor released by coolant boiling in said inner chamber to heat exchanger means situated radially outward of said three chambers so as to reduce pressure and temperature at the coolant liquid-vapor interface in said inner chamber below the corresponding pressure and temperature in said first and second outer chambers.

8. The method of claim 7 including the step of equalizing coolant vapor pressures in said outer chambers.

9. The method of claim 7 wherein the said step of delivering liquefied coolant to each of said three chambers comprises introducing said liquefied coolant near the periphery of each of said three chambers, respectively.

10. The method of claim 9 including the step of equalizing coolant vapor pressures in said outer chambers.

11. A method of monitoring the level of liquefied cryogenic coolant within a rotor containing superconductive windings in an inner one of three axially-adjacent chambers, said level being a coolant liquid-vapor interface, comprising the steps of:
   delivering liquefied cryogenic coolant into a first outer one of said chambers, said liquefied coolant flowing into the inner chamber and thence to the second outer one of said chambers through mutual openings in each pair of axially-adjacent chambers;
   conducting coolant from a predetermined location in a radially-central region of said inner chamber to heat exchanger means situated radially outward of said three chambers so as to reduce pressure and temperature at the coolant liquid-vapor interface in said chamber below the corresponding pressure and temperature in said first and second outer chambers; and
   monitoring flow of warmed coolant vapor from said heat exchanger means to detect any abrupt increase therein as an indication that the level of liquefied coolant in said inner chamber has reached said predetermined location in said radially-central region.

12. The method of claim 11 including the step of adjusting pressure of said liquefied coolant delivered into said first outer one of said chambers such that the level of liquefied coolant in said inner chamber is maintained just radially-outward of said predetermined location in said radially-central region of said inner chamber.

13. A method of maintaining at uniform cryogenic temperature a rotor containing superconductive windings in an inner one of three axially-adjacent chambers, comprising the steps of:
   delivering liquefied cryogenic coolant into a first one of said chambers, said liquefied coolant flowing into said inner chamber and thence to the second outer one of said chambers through mutual openings in each pair of axially-adjacent chambers;
   conducting vaporized coolant from each of said first and second outer chambers, respectively, to each respective one of a pair of thermal distance extensions situated within said rotor axially-outward of each of said first and second outer chambers, respectively; and
   absorbing heat at a location radially-outward of said chambers so as to limit operation of said thermal distance extensions in preventing heat flow into said first and second outer chambers.

* * * * *